(No Model.)
S. MAY.
Billiard Cushion.
No. 233,531. Patented Oct. 19, 1880.
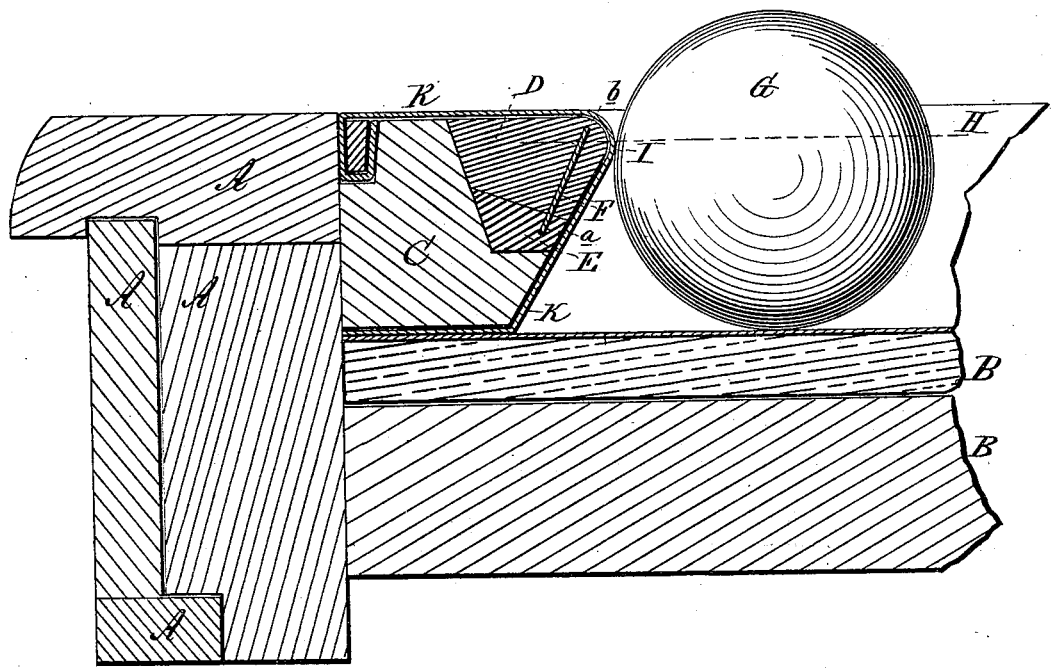
WITNESSES:
Francis McArdle,
C. Sedgwick.
INVENTOR:
S. May.
BY Munn & Co.
ATTORNEYS.

UNITED STATES PATENT OFFICE.

SAMUEL MAY, OF TORONTO, CANADA.

BILLIARD-CUSHION.

SPECIFICATION forming part of Letters Patent No. 233,531, dated October 19, 1880.

Application filed July 31, 1880. (No model.)

*To all whom it may concern:*

Be it known that I, SAMUEL MAY, of Toronto, Dominion of Canada, have invented a new and Improved Cushion for Billiard-Tables, of which the following is a specification.

The object of this invention is to provide a billiard-table cushion of improved shape and elasticity.

The invention consists of a rubber billiard-table cushion having a broad steel ribbon embedded in the rubber and running longitudinally through the entire length of the cushion, and extending from a socket in hard rubber at the bottom of the cushion upward in the elastic rubber to a point above where the ball comes in contact with the cushion, by means of rounded shape of the playing edge or "nosing" of the rubber cushion, which shape admits of the steel ribbon being placed so as to reach a point above where the ball strikes, thus preventing the ball from embedding itself in the rubber, and at the same time giving great elasticity to the cushion, which elasticity will be equal at all points, there being no end tension, so that the angles of incidence and reflection will be correct and equal at all points.

The drawing represents a vertical sectional elevation of the cushion and a portion of a billiard-table.

In the drawing, A represents the cushion-rail. B is the bed of the billiard-table. C is the cushion-socket; D, the elastic rubber portion of the cushion, and E the hard-rubber portion thereof. F represents a tempered-steel ribbon, whose lower edge is held by the hard-rubber socket $a$, while its upper edge extends upward nearly or quite parallel with the face of the portion D of the cushion, through the socket $b$ of said portion D, to a point above where the ball G comes in contact with the cushion, as shown. In this instance the ball G is designed to be two and three-eighths inches in diameter, and its point of contact with the cushion one and seven-sixteenths of an inch above the bed B of the billiard-table, as indicated in dotted lines at H. The rounded playing edge or nosing I of this cushion is set lower than the edge of sharp-edged cushions; consequently the ball G is received nearer its (the ball's) center, and therefore takes a "side" or "English" better, and is easier to cue when lying near the cushion, and this rounded playing-edge I will not cut through the billiard-cloth (represented at K) as quickly as will the usual sharp-edged cushion.

The hard-rubber portion E of the cushion, provided with a socket, $a$, is for the purpose of holding the lower edges of the steel ribbon F firmly, so that no end tension is required.

I do not confine myself to a hard-rubber cushion-bottom, as other substances may be found to answer the same purpose.

The cushion is manufactured by molding and vulcanizing the hard rubber E and soft rubber D together in molds of proper shape, at the same time forming the slot or socket $a$ $b$, into which the steel ribbon F can be inserted after the rubber has been taken from the molds.

Having thus described my invention, what I claim as new, and desire to secure by Letters Patent, is—

1. In billiard-tables, the combination, with an elastic rubber cushion rounded on the playing-edge, of an embedded metallic ribbon running the entire length of the cushion, and extending from its bottom socket up in the elastic rubber to a point above that with which the ball comes in contact, as described.

2. The combination of the hard rubber E, having recess $a$, the soft rubber D, having recess $b$, and the ribbon F, as and for the purpose specified.

3. The method, substantially as herein described, of forming a billiard-table cushion for the reception of a metallic ribbon, which consists in molding and vulcanizing the hard rubber E and elastic rubber D together, and at the same time forming therein the slot or socket $a$ $b$, as set forth.

SAMUEL MAY.

Witnesses:
WILLIAM G. HAYNES,
W. H. STANDISH.